United States Patent
Dlugoss et al.

(10) Patent No.: US 8,050,828 B2
(45) Date of Patent: Nov. 1, 2011

(54) TRANSMISSION OIL MEASUREMENT SYSTEM AND METHOD

(75) Inventors: Randall B. Dlugoss, Royal Oak, MI (US); Bret M. Olson, Whitelake, MI (US)

(73) Assignee: GM Global Technology Operations LLC

(*) Notice: Subject to any disclaimer, the term of this patent is extended or adjusted under 35 U.S.C. 154(b) by 350 days.

(21) Appl. No.: 12/351,161

(22) Filed: Jan. 9, 2009

(65) Prior Publication Data

US 2009/0254256 A1 Oct. 8, 2009

Related U.S. Application Data

(60) Provisional application No. 61/040,917, filed on Mar. 31, 2008.

(51) Int. Cl.
*G06F 7/00* (2006.01)

(52) U.S. Cl. ........... 701/51; 701/29; 701/61; 477/96; 477/107; 123/497

(58) Field of Classification Search .......... 701/60, 701/62, 51; 477/98, 158, 906, 72; 475/117, 475/161; 73/115.02
See application file for complete search history.

(56) References Cited

U.S. PATENT DOCUMENTS

| | | | | |
|---|---|---|---|---|
| 6,035,252 | A * | 3/2000 | Dixon et al. | 701/102 |
| 6,216,726 | B1 * | 4/2001 | Brown et al. | 137/486 |
| 6,259,981 | B1 * | 7/2001 | Wilcosky | 701/29 |
| 6,543,279 | B1 * | 4/2003 | Yones et al. | 73/146.5 |
| 6,835,151 | B2 * | 12/2004 | Fujimine et al. | 475/116 |
| 6,962,547 | B2 * | 11/2005 | Inoue et al. | 475/123 |
| 7,085,628 | B2 * | 8/2006 | Ohmi et al. | 700/299 |
| 7,334,399 | B2 * | 2/2008 | Carroll et al. | 60/286 |
| 7,563,195 | B2 * | 7/2009 | Ota et al. | 477/107 |
| 2005/0257779 | A1 * | 11/2005 | Knight et al. | 123/497 |
| 2005/0284448 | A1 * | 12/2005 | Forgue et al. | 123/497 |
| 2006/0089767 | A1 * | 4/2006 | Sowa | 701/29 |
| 2006/0185429 | A1 * | 8/2006 | Liu et al. | 73/146.5 |
| 2007/0186622 | A1 * | 8/2007 | Firon et al. | 73/38 |
| 2007/0186909 | A1 * | 8/2007 | Ukai et al. | 123/497 |
| 2007/0191182 | A1 * | 8/2007 | Koski et al. | 477/96 |
| 2008/0053191 | A1 * | 3/2008 | Yoo et al. | 73/1.72 |
| 2008/0072666 | A1 * | 3/2008 | Shattuck et al. | 73/118.1 |

* cited by examiner

*Primary Examiner* — Thomas Black
*Assistant Examiner* — Shardul Patel

(57) ABSTRACT

A system includes a pressure sensor that measures a transmission fluid pressure at a first fluid cavity of a transmission. A transmission control module receives the transmission fluid pressure, determines a transmission fluid temperature in the first fluid cavity based on the transmission fluid pressure, and controls the transmission fluid pressure based on the transmission fluid temperature.

18 Claims, 3 Drawing Sheets

TRANSMISSION OIL MEASUREMENT SYSTEM AND METHOD

CROSS-REFERENCE TO RELATED APPLICATIONS

This application claims the benefit of U.S. Provisional Application No. 61/040,917, filed on Mar. 31, 2008. The disclosure of the above application is incorporated herein by reference.

FIELD

The present invention relates to vehicle transmissions, and more specifically to transmission oil measurement systems and methods.

BACKGROUND

The statements in this section merely provide background information related to the present disclosure and may not constitute prior art.

A transmission may have various fluid paths that carry transmission oil. For example, a pressure control device may control a source of pressurized fluid to a brake or clutch within the transmission in order to change gears or drive modes. A transmission may include a transmission control module that may control the operation of the transmission components and diagnose faults within the transmission.

The operation of the transmission control module may be optimized by receiving accurate feedback regarding the operation of the transmission. Measurement of transmission oil characteristics may provide useful regarding transmission status and faults. Pressure and temperature measurements from the transmission fluid may provide information indicative of transmission status or faults based on the source of the measurements.

SUMMARY

A system includes a pressure sensor that measures a transmission fluid pressure at a first fluid cavity of a transmission. A transmission control module receives the transmission fluid pressure, determines a transmission fluid temperature in the first fluid cavity based on the transmission fluid pressure, and controls the transmission fluid pressure based on the transmission fluid temperature.

A method includes measuring a transmission fluid pressure at a first fluid cavity of a transmission with a transmission sensor, determining a transmission fluid temperature in the first fluid cavity based on the transmission fluid pressure, and controlling the transmission fluid pressure based on the transmission fluid temperature.

Further areas of applicability will become apparent from the description provided herein. It should be understood that the description and specific examples are intended for purposes of illustration only and are not intended to limit the scope of the present disclosure.

DRAWINGS

The drawings described herein are for illustration purposes only and are not intended to limit the scope of the present disclosure in any way. The present teachings will become more fully understood from the detailed description and the accompanying drawings, wherein.

DETAILED DESCRIPTION

Figure 1:
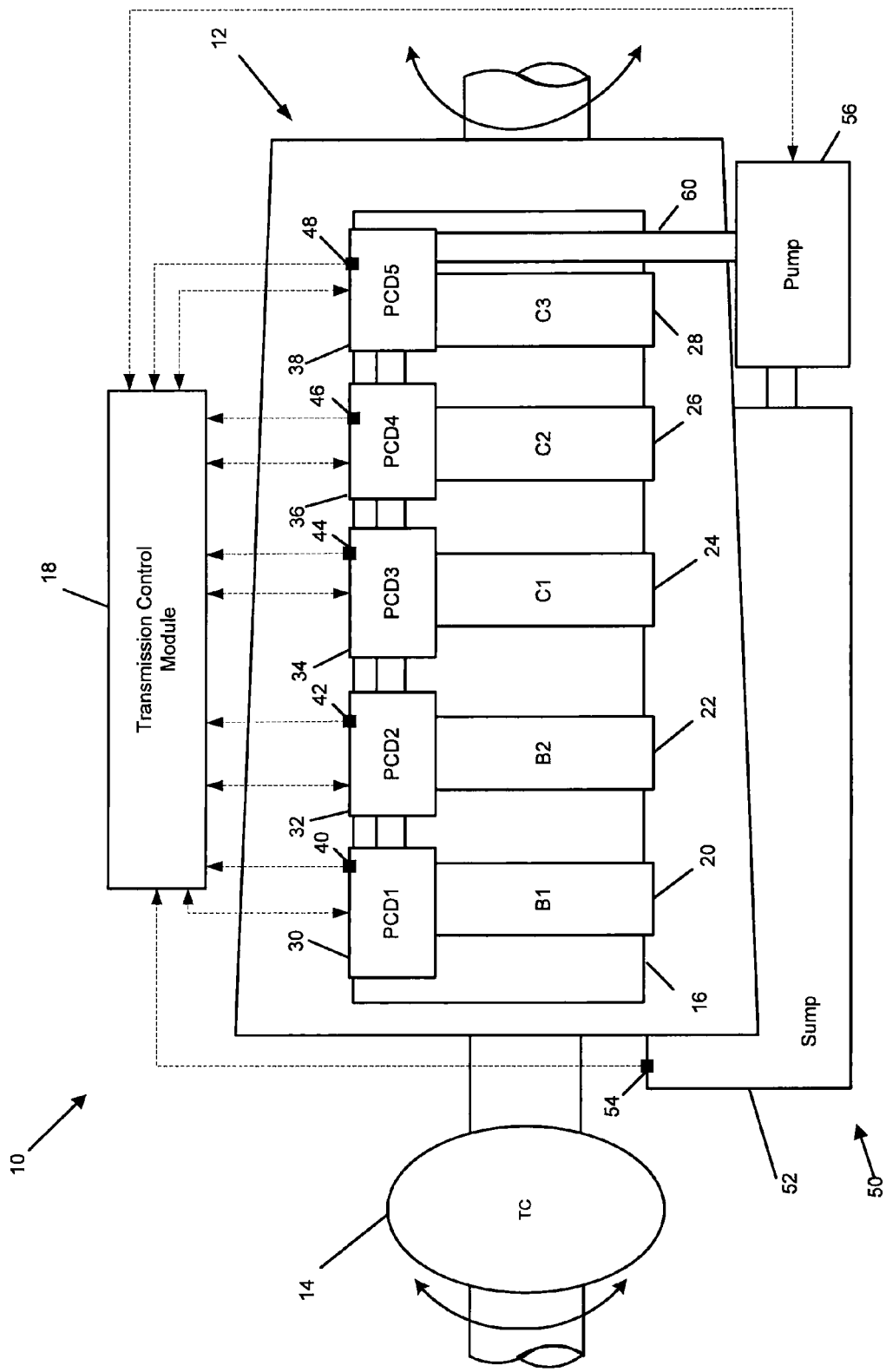
FIG. 1 is a schematic illustration of an exemplary transmission system.

The following description is merely exemplary in nature and is in no way intended to limit the present teachings, applications, or uses. For purposes of clarity, the same reference numbers may be used in the drawings to identify similar elements. As used herein, the term module refers to an application specific integrated circuit (ASIC), an electronic circuit, a processor (shared, dedicated or group) and memory that execute one or more software or firmware programs, a combinational logic circuit, or other suitable components that provide the described functionality.

The transmission oil measurement system and method according to the present disclosure uses a pressure sensor and a fluid temperature sensor in the same integrated circuit package to measure fluid in the same location. For example only, the pressure sensor and the temperature sensor may be located less than 2 mm apart. Accordingly, the pressure sensor and the transmission sensor share the same integrated circuit or set of integrated circuits within the same chip package, such as an ASIC.

Typically, temperature sensors located within an integrated circuit package measure an internal temperature of the integrated circuit package and related components. For example, the integrated circuit package may compensate for and correct errors associated with increased temperatures.

The transmission oil measurement system according to the present disclosure extrapolates the sensed temperature from the pressure sensor integrated circuit package, thereby minimizing the need for additional dedicated temperature sensors outside of the pressure sensor. Accordingly, every pressure sensor in a transmission may provide a temperature measurement in a different location of the transmission. For example, the same wired connections that communicate pressure values may be multiplexed to communicate temperature values.

Referring now to FIG. 1, a schematic of an exemplary transmission system including fluid sensors 40, 42, 44, 46, and 48 is depicted. A transmission system 10 may include transmission 12, torque converter 14, transmission control module 18 and pressure control system 50. Transmission 12 may include planetary gears 16, brake 20, brake 22, clutch 24, clutch 26, and clutch 28. Pressure control system 50 may include sump 52, pump 56, pressure control devices 30, 32, 34, 36, and 38, fluid sensors 40, 42, 44, 46, and 48, sump sensor 54, and fluid supply 60.

Torque converter 14 may receive a torque output from an engine (not shown). Torque converter 14 may transmit that torque to transmission 12. Transmission 12 may have planetary gears 16 that change a gear ratio and a transmission status (park, neutral, drive, or reverse) based on the status of brakes 20 and 22 and clutches 24, 26, and 28. Although brakes 20 and 22 and clutches 24, 26, and 28 are depicted, it should be recognized that the transmission oil measurement system described herein may operate with any fluid-controlled component of transmission 12 and that other arrangements of brakes, clutches and/or planetary gears may be used with the transmission oil measurement system described herein.

Sump 52 may provide a reservoir of transmission oil fluid which may be provided from sump 52 and pressurized by pump 56. Pump 56 may provide pressurized transmission oil to pressure control devices 30, 32, 34, 36, and 38 through fluid supply 60. Based on a signal from transmission control module 18, pressure control devices 30, 32, 34, 36, and 38 may selectively provide pressurized fluid to brakes 20 and 22 and clutches 24, 26, and 28. The pressurized fluid provided to the brakes 20 and 22 and clutches 24, 26, and 28 may allow the brakes 20 and 22 and clutches 24, 26, and 28 to actuate to change the present gear selection of planetary gear 16 within transmission 12.

The actual pressure of the pressurized fluid may not match a commanded or desired pressure. This pressure error may be proportional to temperature. The pressure provided by the transmission fluid may vary in a known relationship based on the temperature of the transmission fluid. Accordingly, sensors may be provided to monitor the pressure and temperature of transmission fluid. For example, pressure and temperature sensors may be located in the same integrated circuit package and directly provide temperature to the transmission control module 18. One or more integrated circuit packages including the sensors may provide the pressure and temperature values via serial communication of digital data. The transmission control module 18 may receive temperature compensated pressure values. Alternatively, the transmission control module 18 may receive uncompensated pressure values and determine fluid temperature indirectly based on calculations, lookup tables, and/or characterized models.

Sump sensor 54 may provide a status signal such as temperature to transmission control module 18. Fluid sensors 40, 42, 44, 46, and 48 may include temperature and pressure sensors and may be located in any fluid path of transmission 12 such as at each of the pressure control devices 30, 32, 34, 36, and 38. Fluid sensors 40, 42, 44, 46, and 48 may come into contact with transmission oil and may be useful in monitoring transmission status and faults. For example, temperature and pressure information from a location close to the pressure control device and/or brakes 20 and 22 and clutches 24, 26, and 28 may be used to match an actual fluid pressure to a desired fluid pressure. This information may also allow transmission control module 18 to confirm a brake or clutch status or to determine a fault such as if a clutch is running hot. However, it should be recognized that any of fluid sensors 40, 42, 44, 46, or 48 could be located at any fluid path of transmission system 10.

Fluid sensors 40, 42, 44, 46, and 48 may communicate with transmission control module 18. Communication may be via analog signals indicating temperature and pressure or may be through serial communications. Transmission control module 18 may also receive signals from sump sensor 54. Transmission control module 18 may provide control signals to pressure control devices 30, 32, 34, 36 and 38.

Figure 2:
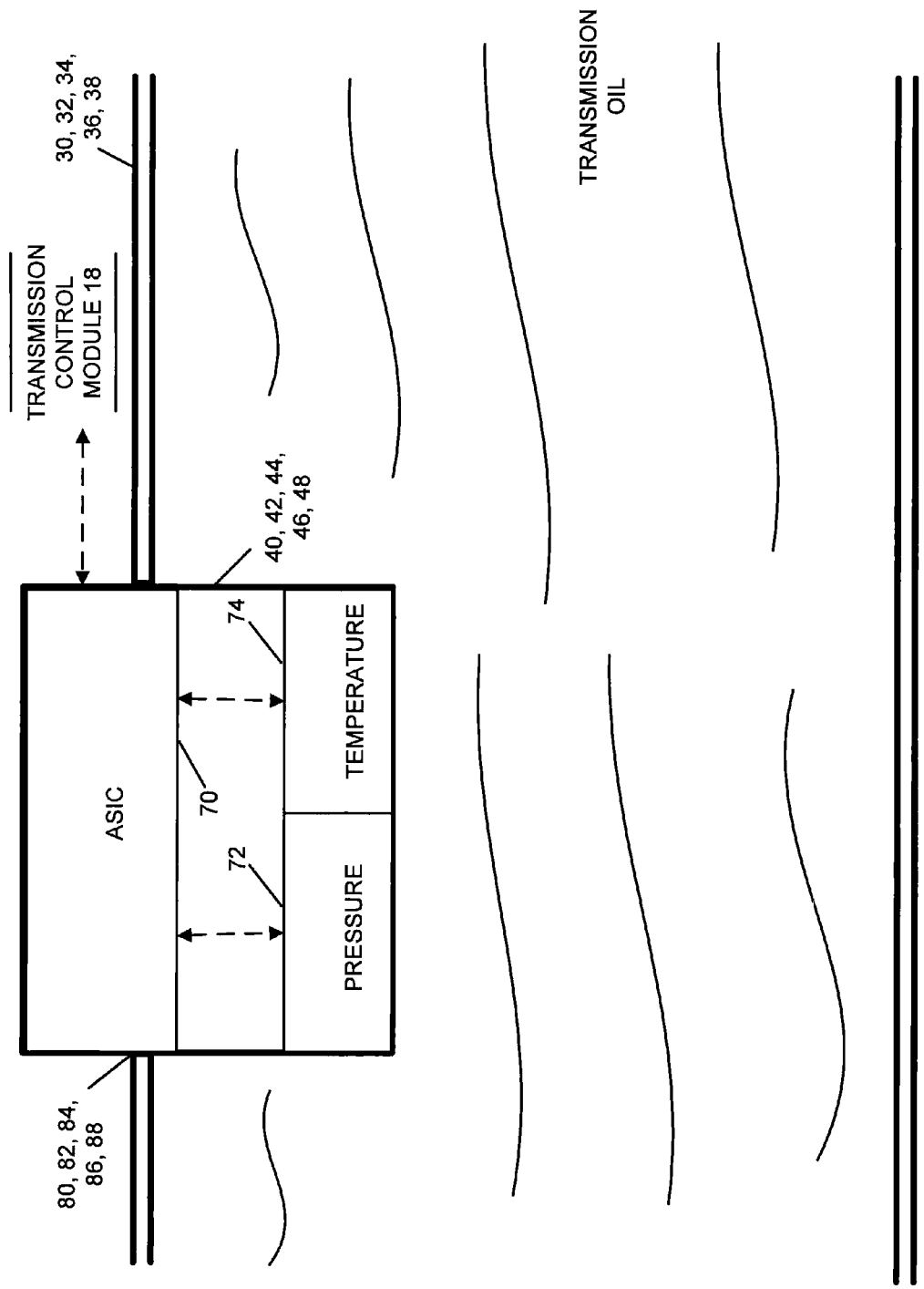
FIG. 2 is a schematic illustration of an exemplary transmission oil measurement device.

Referring now to FIG. 2, an exemplary pressure and temperature sensor 40 of sensors 40, 42, 44, 46, and 48 is depicted within a fluid path of an exemplary pressure control device 30 of pressure control devices 30, 32, 34, 36, and 38. Fluid sensor 40 may include a control module 70, pressure sensor 72, and temperature sensor 74. These components may be integrated or packaged in close proximity to allow measurement of pressure and temperature from a single location within the fluid path. Control module 70 may be an ASIC 70 and may be in communication with transmission control module 18.

As depicted in FIG. 2, fluid sensor 40 may be disposed in pressure control device 30 to come into contact with transmission oil. Pressure control device 30 may include an access port 80 that allows fluid sensor 40 to come into contact with transmission fluid. Each of pressure control devices 30, 32, 34, 36, and 38 may include a respective access port 80, 82, 84, 86, and 88. It should also be recognized that if it is desired to locate fluid sensors 40, 42, 44, 46, and 48 in a location other than within pressure control devices 30, 32, 34, 36, and 38, access ports 80, 82, 84, 86, and 88 may be located accordingly.

Access port 80 may be configured in any manner that provides fixed and sealed engagement between fluid sensor 40 and the fluid path, such as threaded engagement or a sealed press fit. An alternative to providing access ports within the fluid path may also be to provide predetermined fluid diversion paths wherein a small amount of transmission fluid is diverted from the fluid path and delivered to directly to fluid sensor 40.

The pressure sensor 72 and temperature sensor 74 of fluid sensor 40 may be separate components from ASIC 70 or one or more may be integrated into ASIC 70. Pressure sensor 72 and temperature sensor 74 may receive accurate readings of transmission oil parameters from being in contact with the transmission oil. Pressure sensor 72 and temperature sensor 74 may provide pressure and temperature information to ASIC 70.

ASIC 70 may perform calculations and may be in communication with transmission control module 18 to send measured or calculated values to transmission control module 18. ASIC 70 may communicate data directly or may communicate via serial communications. ASIC 70 may receive raw pressure data from pressure sensor 72 and raw temperature data from temperature sensor 74. Calculated values may include temperature-compensated pressure data from a combination of pressure sensor 72 and temperature sensor 74 measurements.

Figure 3:
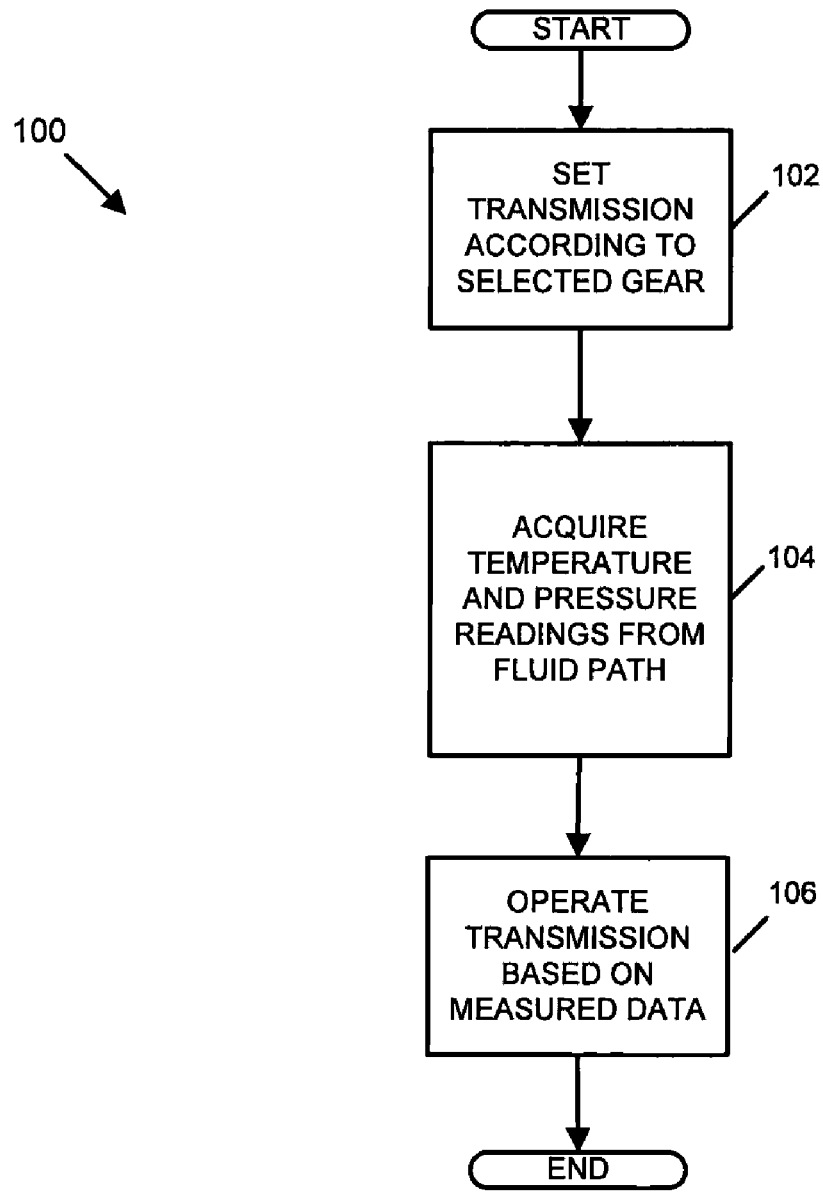
FIG. 3 is a flow diagram describing steps in transmission oil measurement.

Referring now to FIG. 3, control logic 100 for transmission oil measurement using an integrated temperature and pressure measurement device is depicted. At block 102, the transmission may be in a current state such as one commanded by a driver shifting the transmission. Transmission control module 18 module may receive a driver gear selection input (not shown) from the vehicle and may selectively control one or more of pressure control devices 30, 32, 34, 36, and 38.

One of the selected pressure control devices may transmit pressurized transmission oil to one of brakes 20 and/or 22 based on a commanded pressure from transmission control module 18, wherein brakes 20 and/or 22 may actuate to fix rotation of a gear within planetary gears 16. A selected pressure control device may also provide pressurized transmission oil to one or more of clutches 24, 26, and/or 28, as commanded from transmission control module 18. The selected clutch or clutches may engage to allow gears of planetary gears 16 to engage. In this manner, the transmission status may be changed based on a driver changing gear. Control logic 100 may continue to block 104.

At block 104, sump sensor 54 and fluid sensors 40, 42, 44, 46, and 48 may provide measurements to transmission control module 18. The data from sump sensor 54 may include a transmission oil temperature within sump 52. Data received from fluid sensors 40, 42, 44, 46, and 48 may include pressure data, temperature-compensated pressure data, and temperature data.

At block 106, transmission control module 18 may operate transmission 12 based on the measured data from sump sensor 54 and fluid sensors 40, 42, 44, 46, and 48. For example, transmission control module 18 may monitor system faults based on temperatures measured at respective fluid sensors 40, 42, 44, 46, and 48. When located relative to a pressure control device 30, 32, 34, 36, or 38, a fluid sensor may be situated such that excess heat created by a malfunctioning brake 20 or 22 and/or clutch 24, 26, or 28 may be sensed. A fault may be indicated if the measured temperature exceeds a predetermined threshold. Faults may also be indicated by temperature differences between two of sensors 40, 42, 44, 46, 48 and/or 54 exceeding a predetermined threshold.

Referring again to FIG. 2, the transmission control module 18 may also use pressure, temperature, or a calculated temperature based on temperature-compensated and temperature uncompensated pressure readings to operate the transmission 10. For example, transmission control module 18 may provide a commanded pressure to a pressure control device 30, 32, 34, 36, or 38. However, pressure may vary with fluid temperature such that the actual pressure is different from the commanded pressure.

The transmission control module 18 may independently receive a temperature-compensated pressure and a temperature-uncompensated pressure. For example, the ASIC 70 may calculate the temperature-compensated pressure based on the measured temperature of the temperature sensor 74. Conversely, the ASIC 70 may calculate the temperature-uncompensated pressure without considering the measured temperature of the temperature sensor 74. The ASIC 70 transmits both the temperature-compensated and temperature-uncompensated pressures to the transmission control module 18.

The transmission control module 18 may determine a difference between the temperature-compensated and temperature-uncompensated pressures and determine the temperature of the transmission fluid based on the difference. In other words, the difference between the pressure values received from the ASIC 70 may be indicative of the transmission fluid temperature in the vicinity of the ASIC 70. For example, the transmission control module 18 may determine the temperature based on a temperature lookup table and/or calculations that characterize and model the temperature of the transmission fluid.

A relationship between the temperature and the pressure values may be based on a function of different commanded pressure regions (e.g. low, medium, and high commanded pressures), the temperature-compensated and temperature-uncompensated pressure difference, and/or an actual temperature. For example, the transmission control module 18 may use a first, second, and third lookup tables, models, or calculations for each of the low, medium, and high commanded pressures, respectively. For example only, a first pressure region may be less than 100 kPa, a second pressure region may be between 100 and 600 kPa, and a third pressure region may be greater than 600 Kpa.

Accordingly, transmitting measurements of the temperature sensor 74 to the transmission control module 18 is not required. The transmission control module 18 may determine the transmission fluid temperature based on the received transmission fluid pressures.

The ASIC 70 may transmit the temperature-compensated and temperature-uncompensated pressures to the transmission control module 18 using the same wire or wires (e.g. via serial and multiplexed analog and/or digital signals), and/or via wireless transmission. Communication from the ASIC 70 to the transmission control module 18 may indicate whether a particular pressure value is temperature-compensated or temperature-uncompensated. For example, data transmitted from the ASIC 70 may include one or more bits or pulses that indicate whether an associated pressure value is temperature-compensated or temperature-u ncompensated.

Although the present disclosure describes pressure sensors, those skilled in the art can appreciate that any sensor that uses a temperature sensor within the same circuit package may incorporate the above described methods of extracting and extrapolation temperature, including, but not limited to, linear position sensors, torque sensors, and air flow sensors.

Those skilled in the art may now appreciate from the foregoing description that the broad teachings of the present disclosure may be implemented in a variety of forms. Therefore, while this disclosure has been described in connection with particular examples thereof, the true scope of the disclosure should not be so limited since other modifications will become apparent to the skilled practitioner upon a study of the drawings, the specification and the following claims.

What is claimed is:

1. A system comprising:
   a pressure sensor that measures a transmission fluid pressure at a first fluid cavity of a transmission; and
   a transmission control module that receives the transmission fluid pressure, that determines a transmission fluid temperature in the first fluid cavity based on the transmission fluid pressure, and that controls the transmission fluid pressure based on the transmission fluid temperature.

2. The system of claim 1 further comprising an application specific integrated circuit (ASIC) that includes the pressure sensor and a temperature sensor that measures a temperature of the ASIC.

3. The system of claim 2 wherein the transmission fluid temperature is further based on the temperature of the ASIC.

4. The system of claim 2 wherein the transmission fluid pressure includes a compensated transmission fluid pressure that is based on the temperature of the ASIC and an uncompensated fluid pressure that is not based on the temperature of the ASIC, and the transmission control module determines the transmission fluid temperature based on a difference between the compensated transmission fluid pressure and the uncompensated fluid pressure.

5. The system of claim 4 wherein the ASIC transmits the transmission fluid pressure to the transmission control module and transmits data indicative of whether the transmission fluid pressure includes one of the compensated and uncompensated transmission fluid pressures.

6. The system of claim 1 wherein the transmission control module determines the transmission fluid temperature using at least one of a lookup table and a model.

7. The system of claim 1 wherein the transmission control module controls at least one of a solenoid and a valve based on the transmission fluid temperature.

8. The system of claim 1 wherein the pressure sensor is located in the first cavity.

9. The system of claim 1 wherein the transmission control module diagnoses a fault condition based on the transmission fluid temperature and a status of the transmission.

10. A method comprising:
    measuring a transmission fluid pressure at a first fluid cavity of a transmission with a pressure sensor;
    determining a transmission fluid temperature in the first fluid cavity based on the transmission fluid pressure; and
    controlling the transmission fluid pressure based on the transmission fluid temperature.

11. The method of claim 10 further comprising providing an application specific integrated circuit (ASIC) that includes the pressure sensor and a temperature sensor that measures a temperature of the ASIC.

12. The method of claim 11 wherein the transmission fluid temperature is further based on the temperature of the ASIC.

13. The method of claim 11 wherein the transmission fluid pressure includes a compensated transmission fluid pressure that is based on the temperature of the ASIC and an uncompensated fluid pressure that is not based on the temperature of the ASIC, and further determining the transmission fluid temperature based on a difference between the compensated transmission fluid pressure and the uncompensated fluid pressure.

14. The method of claim 13 wherein the ASIC transmits data indicative of whether the transmission fluid pressure includes one of the compensated and uncompensated transmission fluid pressures.

15. The method of claim 10 further comprising determining the transmission fluid temperature using at least one of a lookup table and a model.

16. The method of claim 10 further comprising controlling at least one of a solenoid and a valve based on the transmission fluid temperature.

17. The method of claim 10 wherein the pressure sensor is located in the first cavity.

18. The method of claim 10 further comprising diagnosing a fault condition based on the transmission fluid temperature and a status of the transmission.

* * * * *